May 19, 1936. H. TUECKMANTEL 2,041,384
LINE DRYING REEL
Filed May 7, 1935
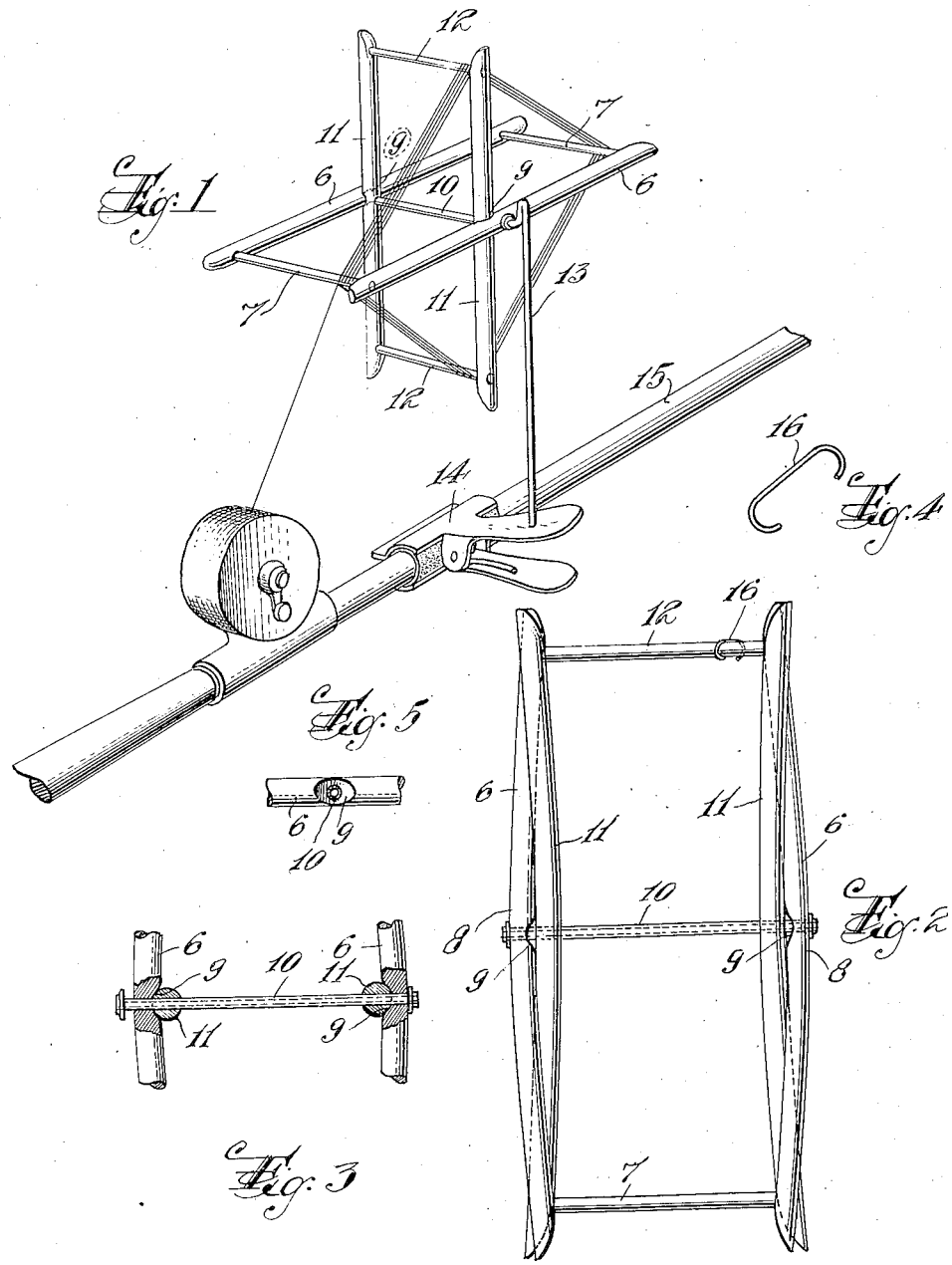
INVENTOR
HUGO TUECKMANTEL
BY
ATTORNEY Patented May 19, 1936

2,041,384

UNITED STATES PATENT OFFICE 2,041,384

LINE DRYING REEL

Hugo Tueckmantel, East Orange, N. J.

Application May 7, 1935, Serial No. 20,181

2 Claims. (Cl. 242—104)

This invention relates to reels for drying fish lines, and more particularly to a reeling device which is adapted to be readily and conveniently attached to a fish rod or a similar suitable support.

It is an object of the invention to provide a simple and effective line drying reel which can be collapsed so as to occupy a minimum amount of space when not in use; and which is automatically expansible to the proper shape necessary for effective drying of fish lines when so desired.

A further object is the provision of a device for drying fish lines which is adapted to be attached to a fishing rod or a similar support and which is simple in structure, thereby considerably reducing the cost of manufacture thereof.

These and other advantageous objects, which will later appear, are accomplished by the simple and practical construction and arrangement of parts hereinafter described and exhibited in the accompanying drawing, forming part hereof, and in which:

Fig. 1 is a perspective view showing my fish line drying reel attached to a fishing rod.

Fig. 2 is a plan view of the drying reel in a collapsed condition,

Fig. 3 is a view showing the manner in which parts of the drying reel cooperate to automatically maintain the device in an expanded condition, Fig. 4 is a view showing a clip for holding the parts in a collapsed condition, and Fig. 5 is a plan view showing a detail for automatically holding the elements of the device in an expanded position.

Referring to the drawing, the fish line drying reel is shown to comprise a member formed from a pair of side bars 6 substantially circular in cross section, which are joined at their ends by short bars 7 to form a rectangle. The bars 6 are bowed outwardly at the mid-points 8 thereof, at which point they are provided on their inner surfaces with notches 9 through which passes a tubular shaft 10 having rotatably mounted thereon a similar member formed by two side bars 11 joined at their ends by bars 12 to form substantially a rectangle.

Inserted in the tubular shaft 10 is a rod 13, attached to a clamp 14 for attaching the device to a fishing rod 15 as shown in Fig. 1.

In constructing the device, the internal rectangular member is formed with the bars 11 substantially straight, and the external rectangular member is formed with the bars 6 substantially straight.

However, the internal member having the rods 11, has an over-all width greater than the distance between the bars 6; and when the internal member is inserted between the bars 6, due to the differences in width, the bars 6 are caused to bow outwardly at the centers 8 thereof, and the bars 11 are caused to bow inwardly as shown in Fig. 2. The notches 9 are then formed, and due to the outward bowing of the bars 6 and the inward bowing of the bars 11, the rectangular members at all times assume a position at right angles to each other.

When not in use the two members can be rotated towards each other and the drying reel held in a collapsed condition by means of a clip 16 as shown in Fig. 2 and Fig. 4. When the clip 16 is removed the members will automatically spring to a position at right angles to each other as shown in Fig. 1; and will be held in such a position by the engagement of the bars 11 in the notches 9.

From the above description it will be seen that I have provided a reel for drying fishing lines which is extremely simple in structure, and which can be manufactured at a small cost. The device obviously is convenient in that it can be collapsed, when not in use, to occupy a relatively small space, enabling it to be carried in the pockets of a fisherman without interfering noticeably with his fishing operations.

As will be seen from the drawing, the device has comparatively few parts, comprising substantially two similar rectangular members, the inner member having an over-all width greater than the external width of the outer rectangular member, said members being made preferably of wood. However, it should be noted that the members can be made also of a metal which will bow outwardly and inwardly as above described.

The foregoing disclosure is to be regarded as descriptive and illustrative only, and not as restrictive or limitative of the invention, of which obviously an embodiment may be constructed including many modifications, without departing from the general scope herein indicated and denoted in the appended claims.

Having thus described my invention what I claim as new and desire to secure by Letters Patent, is:

1. A fish line drying reel, comprising an external member having a pair of side bars joined at their ends by rods to form substantially a rectangle, a shaft passing through the mid-points of said side bars, an internal member having side bars joined at their ends by bars to form substantially a rectangle, the over-all width of said internal member being greater than the distance between the side bars of the external member, so that when the internal member is inserted in the external member the side bars of the external member will be bowed outwardly and the side bars of the internal member will be bowed inwardly, the side bars of the internal member being rotatably mounted on the shaft, said bars of the external member having notches at the midpoints thereof to receive the bars of the internal member, so that when in an operative condition said members are maintained substantially at right angles to each other.

2. A fish line drying reel, comprising an external member having a pair of side bars joined at their ends by rods to form substantially a rectangle, a tubular shaft passing through the midpoints of said side bars, an internal member having side bars joined at their ends by bars to form substantially a rectangle, the over-all width of said internal member being greater than the distance between the side bars of the external member, so that when the internal member is inserted in the external member the side bars of the external member will be bowed outwardly and the side bars of the internal member will be bowed inwardly, the side bars of the internal member being rotatably mounted on the shaft, a rod inserted in said tubular shaft, and a clamp attached to said rod for attaching the fish line drying device to a support.

HUGO TUECKMANTEL.